United States Patent
Li et al.

(10) Patent No.: US 8,345,961 B2
(45) Date of Patent: Jan. 1, 2013

(54) IMAGE STITCHING METHOD AND APPARATUS

(75) Inventors: Kai Li, Shenzhen (CN); Yuan Liu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/045,281

(22) Filed: Mar. 10, 2011

(65) Prior Publication Data

US 2011/0158509 A1    Jun. 30, 2011

Related U.S. Application Data

(63) Continuation of application No. PCT/CN2009/072927, filed on Jul. 27, 2009.

(30) Foreign Application Priority Data

Sep. 10, 2008   (CN) .......................... 2008 1 0212183

(51) Int. Cl.
*G06K 9/00* (2006.01)
(52) U.S. Cl. ........................... 382/154; 348/42; 382/294
(58) Field of Classification Search .................. 382/154; 345/419, 427; 356/12, 21, 22; 348/42
See application file for complete search history.

(56) References Cited

U.S. PATENT DOCUMENTS

| | | | |
|---|---|---|---|
| 5,617,334 A | 4/1997 | Tseng et al. | |
| 5,703,961 A | 12/1997 | Rogina et al. | |
| 5,917,940 A * | 6/1999 | Okajima et al. | 382/173 |
| 6,097,854 A * | 8/2000 | Szeliski et al. | 382/284 |
| 6,639,596 B1 * | 10/2003 | Shum et al. | 345/427 |
| 6,970,593 B2 * | 11/2005 | Furukawa | 382/154 |
| 7,006,709 B2 * | 2/2006 | Kang et al. | 382/294 |
| 7,161,614 B1 * | 1/2007 | Yamashita et al. | 348/42 |
| 7,274,825 B1 | 9/2007 | Lee et al. | |
| 7,277,118 B2 | 10/2007 | Foote | |
| 7,425,984 B2 * | 9/2008 | Chen et al. | 348/159 |
| 7,630,579 B2 * | 12/2009 | Mai et al. | 382/284 |
| 7,813,589 B2 * | 10/2010 | Silverstein et al. | 382/284 |
| 2002/0172859 A1 | 11/2002 | Roh et al. | |
| 2005/0286567 A1 | 12/2005 | Cherukuri et al. | |

(Continued)

FOREIGN PATENT DOCUMENTS

CN    101034253 A    9/2007

(Continued)

OTHER PUBLICATIONS

Extended European Search Report issued in corresponding European Patent Application No. 09812625.3, mailed Aug. 9, 2011.

(Continued)

*Primary Examiner* — Samir Ahmed
(74) *Attorney, Agent, or Firm* — Brinks Hofer Gilson & Lione

(57) ABSTRACT

The present invention relates to an image processing technology, and discloses an image stitching method and apparatus to solve the problem of severe ghosting of an image stitched in the prior art. In the embodiments of the present invention, the overlap region of two images is found, a depth image of the overlap region is obtained, and the two images are stitched together according to the depth image. In the stitching process, the 3-dimensional information of the images is obtained by using the depth image to deghost the image. The method and apparatus under the present invention are applicable to multi-scene videoconferences and the occasions of making wide-view images or videos.

11 Claims, 6 Drawing Sheets

U.S. PATENT DOCUMENTS

2006/0072852 A1     4/2006    Kang et al.
2009/0067707 A1     3/2009    Sim et al.

FOREIGN PATENT DOCUMENTS

| | | |
|---|---|---|
| CN | 101051386 A | 10/2007 |
| KR | 10-2009-0027003 | 3/2009 |
| WO | WO 2008029345 A1 | 3/2008 |

OTHER PUBLICATIONS

Pollefeys et al., "Detailed Real-Time Urban 3D Reconstruction from Video", International Journal of Computer Vision. vol. 78, 2008.

Office Action issued in corresponding Chinese Patent Application No. 200810212183.8, mailed Feb. 23, 2011.

International Search Report and Written Opinion issued in corresponding PCT Patent Application No. PCT/CN2009/072927, mailed Oct. 29, 2009.

Office Action issued in corresponding Chinese Patent Application No. 200810212183.8, mailed Mar. 23, 2012.

Sheng et al., "Virtue Plane Mapping: A Method of Rendering into Depth Images" Journal of Software, vol. 19, No. 7, Jul. 2008.

Chinese Patent No. 101673395 issued on Sep. 5, 2012, granted in corresponding Chinese patent application 200810212183.8.

Pei-zhen et al., Arithmetic of Automatic Mosaic for Multi-Viewpoint Overlapped Images Navigation of China, No. 2, Ser. No. 49, Dec. 2001.

\* cited by examiner

IMAGE STITCHING METHOD AND APPARATUS

CROSS-REFERENCE TO RELATED APPLICATIONS

This application is a continuation of International Application No. PCT/CN2009/072927, filed on Jul. 27, 2009, which claims priority to Chinese Patent Application No. 200810212183.8, filed on Sep. 10, 2008, both of which are hereby incorporated by reference in their entireties.

FIELD OF THE INVENTION

The present invention relates to an image processing technology, and in particular, to an image stitching method and apparatus.

BACKGROUND OF THE INVENTION

By using a reflecting/refractive system and hardware devices such as fish-eye lens, seamless wide-view images can be established directly. However, such hardware devices capture as much information as possible on a limited imaging plane, as a result, the seamless wide-view images are distorted seriously.

A digital imaging device photographs images in a digital format. Multiple digital images are stitched together to form a wide-view digital panoramic image. The final digital panoramic image involves little distortion. The prevalent image stitching technologies are as follows:

(1) Multiple images are obtained by photographing from different view directions at a fixed viewpoint, and then the point-to-point mapping relation (also known as homography) between the images is calculated, and the relation is primarily reflected as pan, tilt, affine and projection transformation; afterward, all images are projected onto a uniform coordinate system according to the mapping relation, and stitched into a wide-view image or into a 360-degree image; finally, the seams on the overlap region formed in the stitching process of images are eliminated by using a smooth function.

This image stitching method is generally applied to virtual roaming on the Internet. People who visit a website can browse the panoramic images of objects like those in the real world. However, in this stitching method, only the images obtained by photographing at a fixed viewpoint make sense. All images have to be obtained by photographing at the same static position. Otherwise, the stitched image has ghosts due to parallax, and the stitching region is unnatural. In practice, it is hard to obtain images by photographing at the same static position, namely, it is hard to rotate the camera around the optical center to make optical centers of all images coincide.

(2) After the images are obtained from different viewpoints, certain continuous intermediate points among the viewpoints are used as new viewpoints to reconstruct images, and then the overlap region between the old image and the reconstructed image is found, and the images are stitched according to the overlap region.

The method for using intermediate points as viewpoints to reconstruct images can deghost the stitched image which has ghosts caused by parallax between two viewpoints. However, if the parallax of the original images is too large, too many intermediate point images need to be generated to deghost the stitched image, and enormous calculations are required. When images of more than two viewpoints are stitched, too many intermediate point images are generated, and the image stitching takes too much time.

(3) The focal length of the camera, principal point coordinates, distortion factor, rotation angle, and rotation position are obtained through calibration of the camera, in order to calculate the mapping relation for the images obtained by the camera.

The third method above involves calibration of the camera, which is difficult in the computer field. Meanwhile, in this method, the backgrounds of the obtained images need to be set as a single background to ignore parallax of backgrounds in parallax compensation.

SUMMARY OF THE INVENTION

The embodiments of the present invention provide an image stitching method and apparatus to deghost the stitched image without imposing strict restrictions on the application scenario.

To fulfill such objectives, the embodiments of the present invention are based on the following technical solution:

An image stitching method includes:
obtaining two images between which an overlap region exists;
searching for the overlap region of the two images;
obtaining a depth image of the overlap region; and
stitching the two images into one image according to the depth image.

An image stitching apparatus includes:
a first obtaining unit, configured to obtain two images between which an overlap region exists;
a searching unit, configured to search for the overlap region of the two images;
a second obtaining unit, configured to obtain a depth image of the overlap region; and
a stitching unit, configured to stitch the two images into one image according to the depth image.

By using the method and apparatus, in the process of stitching two images, the overlap region between the images is found first, and then a depth image of the overlap region is obtained. The depth image reflects the distance from each pixel point to the camera precisely. If the photographing backgrounds of the images are not a single background, the information in the images generates parallax due to different distances to the camera, and the pixels in the images are located at different layers. The method and apparatus disclosed herein may calculate the parallax between the layers precisely by using the depth image, and the pixels of the overlap region can be processed precisely in the process of stitching images to deghost the stitched image. Therefore, the method and apparatus provided herein can deghost the stitched image without imposing strict restrictions on the application scenario.

Meanwhile, the stitching process under the present invention involves only two images and a depth image of the overlap region, and involves no recalculation of the images of the intermediate viewpoints, thus reducing the calculation load massively.

BRIEF DESCRIPTION OF THE DRAWINGS

To illustrate the technical solution under the present invention or the prior art more clearly, the following describes the accompanying drawings involved in description of the embodiments of the present invention or the prior art. Apparently, the accompanying drawings outlined below are exemplary only and not exhaustive. Persons of ordinary skill in the art can derive other drawings from such accompanying drawings without any creative efforts.

DETAILED DESCRIPTION OF THE EMBODIMENTS

The technical solution under the present invention is described in detail with reference to embodiments and accompanying drawings. Evidently, the embodiments herein are merely representative of particular embodiments of the present invention, and shall be regarded as illustrative in nature and not exhaustive or restrictive. All other embodiments, which can be derived by those skilled in the art from the embodiments given herein without any creative efforts, shall fall within the scope of the present invention.

First Embodiment

Figure 1:
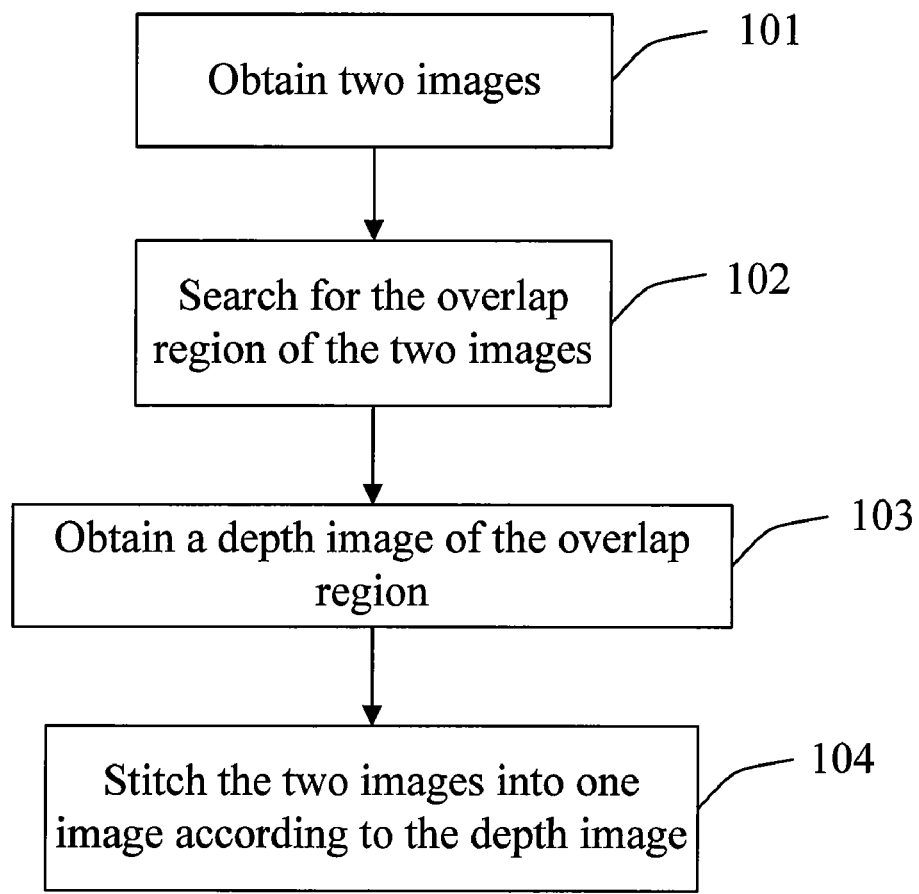
FIG. 1 is a flowchart of an image stitching method in the first embodiment of the present invention.

As shown in FIG. 1, an image stitching method in this embodiment includes the following steps:

101. Obtain two images by photographing on cameras in real time, or through retrieval from an existing image library.

102. Search for the overlap region of the two images. If the two images are suitable for stitching, the objects in the two images should coincide partially.

The overlap region may be found by using: Scale-Invariant Features (SIFT) feature point detection method, Harris feature point detection method, Susan feature point detection method, stereo matching method, or other feature point detection methods. In some cases, the feature points may be selected manually to obtain the overlap region.

The SIFT feature point detection method is currently prevalent because it is affine-invariant. Therefore, the SIFT feature point detection method is used herein to find the overlap region.

103. Obtain a depth image of the overlap region to represent the 3-dimensional information of the overlap region. The 3-dimensional information of the overlap region is required for precise image stitching.

104. Stitch the two images into one image according to the depth image to prevent ghosts in the overlap region of the stitched image.

Figure 2:
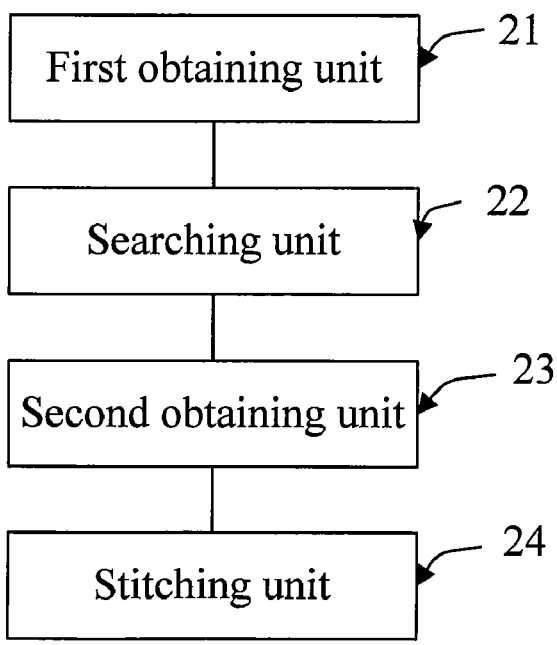
FIG. 2 shows a structure of an image stitching apparatus in the first embodiment of the present invention.

As shown in FIG. 2, an image stitching apparatus provided in the first embodiment of the present invention includes a first obtaining unit 21, a searching unit 22, a second obtaining unit 23, and a stitching unit 24; where the first obtaining unit 21 is configured to obtain two images, where: the first obtaining unit 21 is a pair of cameras if the two images are obtained by photographing on cameras in real time, or the first obtaining unit 21 is an input interface if the two images are retrieved from an existing image library;

the searching unit 22 is configured to search for the overlap region of the two images, where the searching unit 22 may be used the working principles described in step 102 above; the second obtaining unit 23 is configured to obtain the depth image of the overlap region found by the searching unit; and the stitching unit 24 is configured to stitch the two images into one image according to the depth image.

By using the image stitching method and apparatus in this embodiment, if the photographing backgrounds of the images are not a single background, the pixels in the images are located at many layers. The method and apparatus in this embodiment may calculate the parallax between the layers precisely by using the depth image, and the pixels of the overlap region can be processed precisely in the process of stitching images to deghost the stitched image.

Second Embodiment

Figure 3:
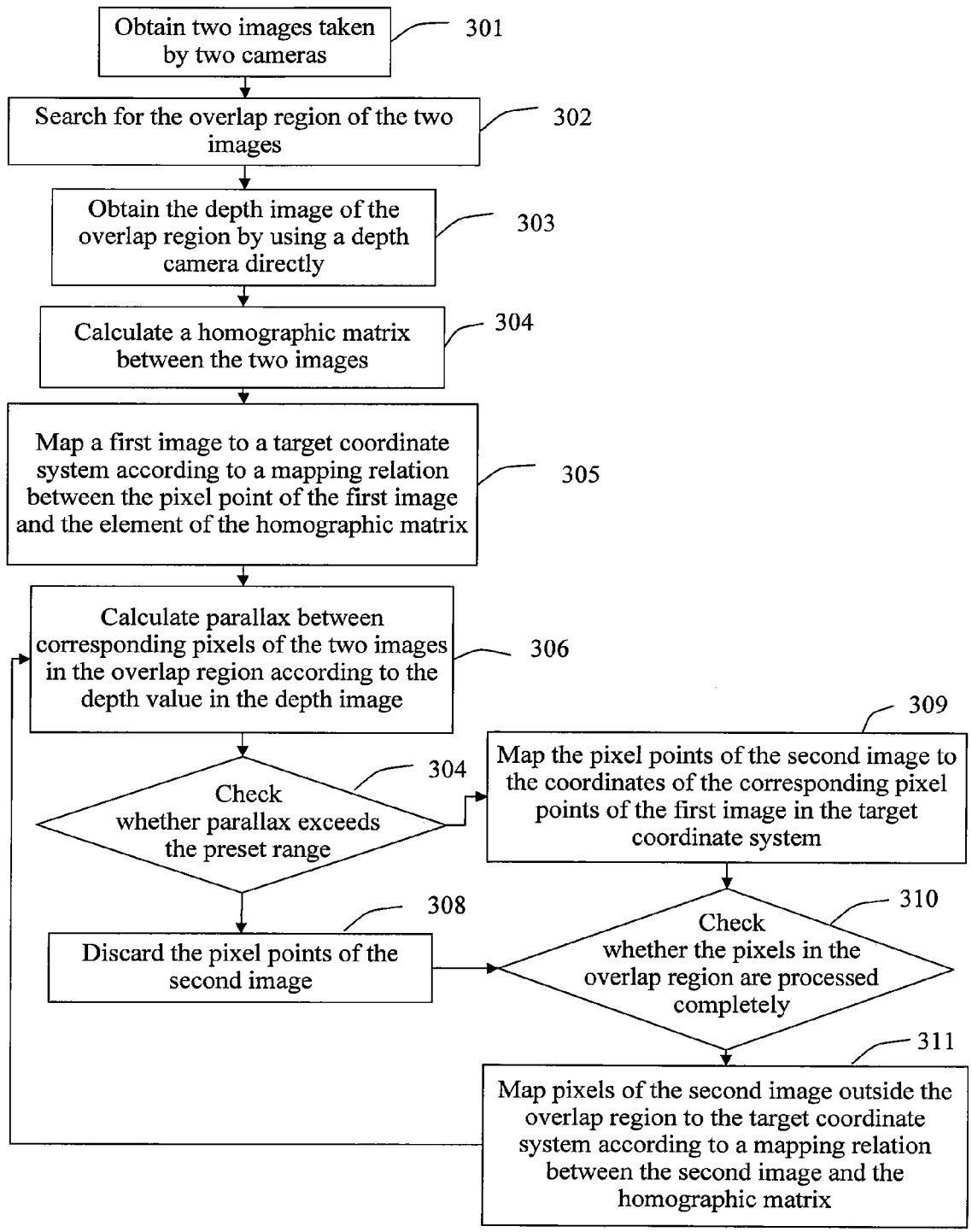
FIG. 3 is a flowchart of an image stitching method in the second embodiment of the present invention.

As shown in FIG. 3, an image stitching method in this embodiment includes the following steps:

301. Use two cameras to photograph objects and obtain two images. An overlap region exists between the objects of the two images.

302. Search for the overlap region of the two images. In practice, the overlap region may be found by using: SIFT feature point detection method, Harris feature point detection method, Susan feature point detection method, 3-dimensional image matching method, or other feature point detection methods. In some cases, the feature points may be selected manually to obtain the overlap region.

303. Use a depth camera to obtain a depth image of the overlap region directly. The depth camera measures the distance from the object to the depth camera directly by physical means, for example, by emitting an electromagnetic wave or an infrared ray to the object. The distance from the object to the depth camera is determined according to the time required for reflecting the electromagnetic wave or infrared ray from the object. That is, in this embodiment, two ordinary cameras mentioned in step 301 need to obtain the two images, and the depth camera needs to obtain the depth image.

Described above is an exemplary method for obtaining the depth image of the overlap region. In practice, the method for obtaining the depth image depends on the scene, for example, the depth image is determined by performing the calculation of the parallax between the two images.

The parallax means a distance existing between the two cameras, and the distance (depth) from an object point to the cameras is not infinitely great. Therefore, the imaging position of the same object point is different in the two cameras, which is known as parallax. Generally, greater depth leads to smaller parallax, and smaller depth leads to greater parallax.

Figure 4:
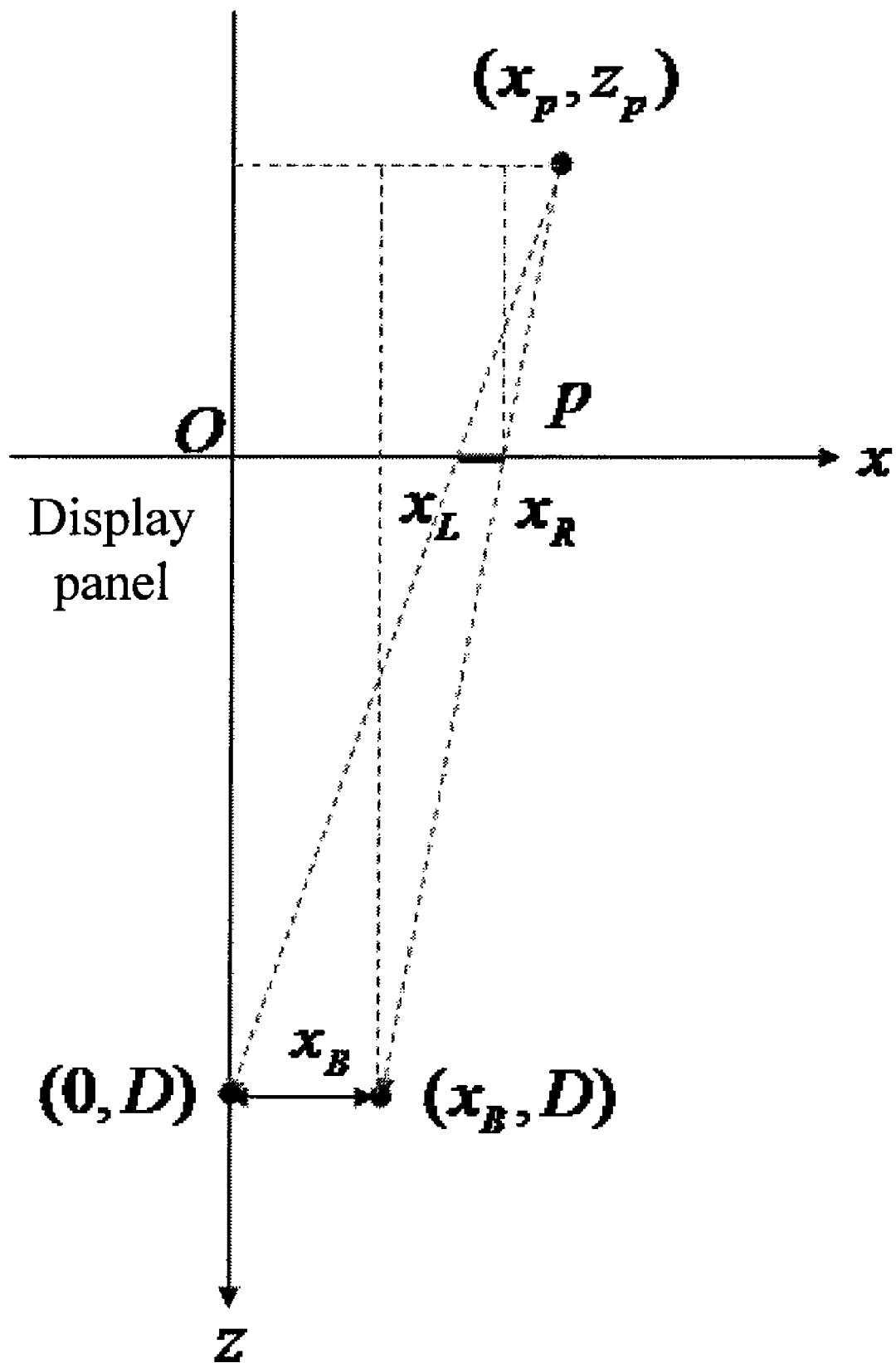
FIG. 4 shows a geometric relation between depth and parallax in the second embodiment of the present invention.

As shown in FIG. 4, parallax p is related to depth $z_p$ as follows:

$$\begin{cases} \dfrac{x_L}{D} = \dfrac{x_p}{D - z_p} \\ \dfrac{x_R - x_B}{D} = \dfrac{x_p - x_B}{D - z_p} \end{cases} \Rightarrow \dfrac{x_L - x_R + x_B}{D} =$$

$$\dfrac{x_B}{D - z_p} \Rightarrow p = x_B\left(1 - \dfrac{D}{D - z_p}\right) = x_B\left(\dfrac{1}{\frac{z_p}{D} - 1} + 1\right)$$

$X_L - X_R$ is parallax, D is the focal length of the camera, and $x_B$ is the distance between cameras. When the depth is small, the relation between parallax p and depth $z_p$ is equivalent to $$p \approx \frac{x_B}{D} z_p.$$

Therefore, the depth image may be calculated according to the parallax after the parallax is calculated through image matching. In this embodiment, the following two calculation methods are applicable:

(1) Calculate the parallax between the corresponding pixels in the overlap region of the two images directly, and calculate the depth image of the overlap region according to the parallax.

(2) Obtain two new images in the overlap region at two viewpoints, calculate the parallax between the corresponding pixels in the two new images, and calculate the depth image in the overlap region according to the parallax.

The first method above does not need to separately obtain images for calculating parallax, which reduces the cameras required; and the second method requires an additional binocular camera.

After the depth image of the overlap region is obtained, the images can be stitched. The stitching process is described below.

304. Calculate the homographic matrix between the two images. Every pixel point on the two images has a corresponding matrix element in the homographic matrix.

305. Map the first image to the target coordinate system according to the mapping relation between the pixel point and the element in the homographic matrix because every pixel in each image corresponds to an element in the homographic matrix.

Generally, the mapping is equivalent to completely mapping all pixel points in the first image to the target coordinate system. Therefore, the target coordinate system may be simply the coordinate system of the first image. In this way, the complex mapping operation is not required for the first image, and the mapping function in this step can be performed as long as the first image is reserved completely.

306. Calculate parallax between corresponding pixels of the two images in the overlap region respectively according to the depth value in the depth image, considering that parallax p is related to depth $z_p$ as $$p \approx \frac{x_B}{D} z_p,$$

where D is the focal length of the camera, and $x_B$ is the distance between cameras, as mentioned in step 304.

307. Judge whether the calculated parallax exceeds the preset parallax range. If so, proceed to step 309; if the calculated parallax does not exceed the preset parallax range, proceed to step 308. Considering the precision required for the stitched image, the preset parallax range is 0 pixel to 1 pixel preferably.

308. Discard the pixel points of the second image, and proceed to step 310.

309. Map the pixel points of the second image to the coordinates of the corresponding pixel points of the first image in the target coordinate system. That is, calculate the weighted average chrominance value and weighted average luminance value of the corresponding pixel points in the two images, use the weighted average chrominance value and the weighted average luminance value as the chrominance value and the luminance value of the corresponding pixel points in the first image in the target coordinate system respectively, and then proceed to step 310.

310. Judge whether the pixels of the overlap region are processed completely. If so, proceed to step 311; if the pixels of the overlap region are not processed completely, go back to step 306.

311. Map the pixels outside the overlap region in the second image to the target coordinate system according to the mapping relation between the pixel in the second image and the element in the homographic matrix. This step is equivalent to mapping the pixels outside the overlap region to the target coordinate system directly. The target coordinate system in this embodiment is the coordinate system of the first image.

Figure 5:
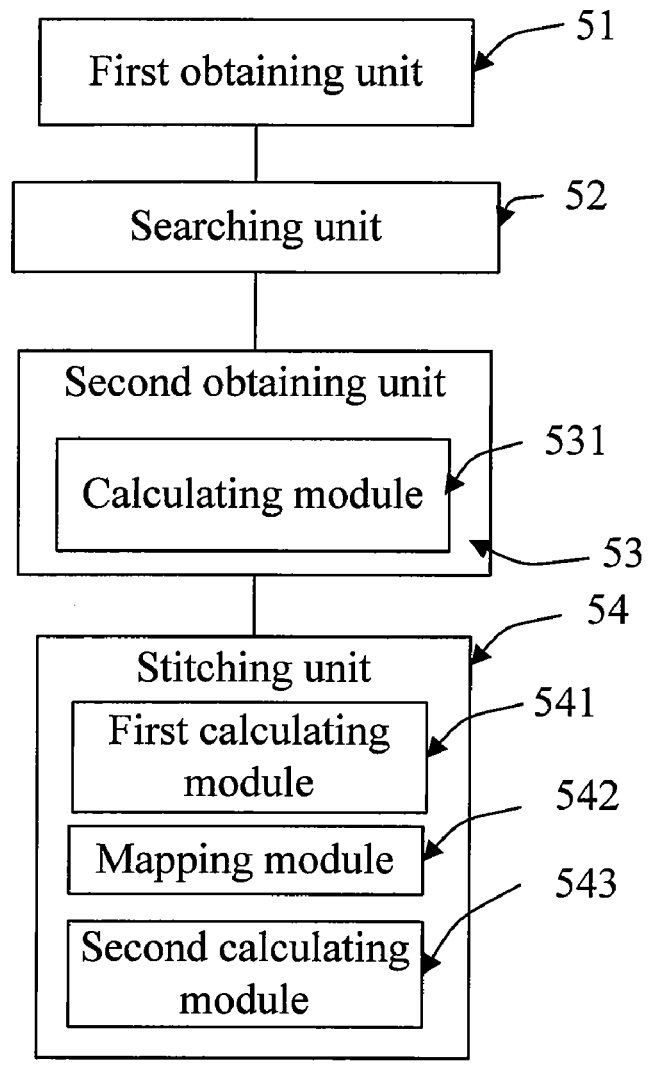
FIG. 5 shows a structure of an image stitching apparatus in the second embodiment of the present invention.

Corresponding to the foregoing image stitching method, an image stitching apparatus is provided in the second embodiment of the present invention. As shown in FIG. 5, the image stitching apparatus includes: a first obtaining unit 51, a searching unit 52, a second obtaining unit 53, and a stitching unit 54.

The first obtaining unit 51 is configured to obtain two images. In this embodiment, the two images are obtained by photographing on cameras in real time. Therefore, the first obtaining unit 51 is a pair of ordinary cameras. The searching unit 52 is configured to search for the overlap region of the two images.

After the overlap region is stitched, the two images are stitched. To reduce ghosts generated in the stitching of the overlap region, a depth image of the overlap region needs to be obtained first. The second obtaining unit 53 in this embodiment is configured to obtain the depth image of the overlap region. The second obtaining unit 53 may work in the following ways:

(1) The second obtaining unit 53 serves as a depth camera directly.

(2) The second obtaining unit 53 includes a calculating module 531. The calculating module 531 is configured to calculate the parallax between the corresponding pixels in the overlap region of the two images, and calculate the depth image of the overlap region according to the parallax. Parallax p is related to depth $z_p$ as $$p \approx \frac{x_B}{D} z_p,$$

where D is the focal length of the camera, and $x_B$ is the distance between cameras.

Figure 6:
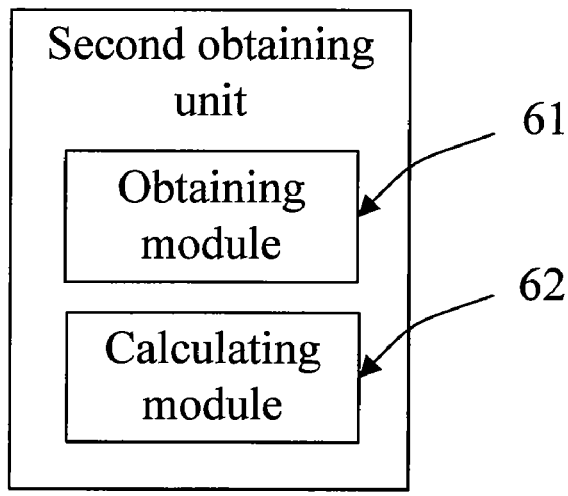
FIG. 6 shows a structure of a second obtaining unit in the second embodiment of the present invention.

(3) As shown in FIG. 6, the second obtaining unit includes an obtaining module 61 and a calculating module 62.

The obtaining module 61 is configured to obtain two new images in the overlap region at two viewpoints, and is equivalent to a binocular camera.

The calculating module 62 is configured to calculate the parallax between the corresponding pixels in the two new images, and calculate the depth image in the overlap region according to the parallax. Parallax p is related to depth $z_p$ as $$p \approx \frac{x_B}{D} z_p,$$

where D is the focal length of the camera, and $x_B$ is the distance between cameras.

After the foregoing depth image is obtained, the stitching unit stitches the two images into one image according to the depth image. The stitching unit 54 includes a first calculating module 541, a mapping module 542, and a second calculating module 543.

The first calculating module 541 is configured to calculate the homographic matrix between two images. Every pixel in the two images has a corresponding element in the homographic matrix. If two pixel points in the two images correspond to the same point in the object, the two pixel points correspond to the same element in the homographic matrix. The mapping module 542 is configured to map the first image to the target coordinate system according to the mapping relation between the first image and the homographic matrix. The second calculating module 543 is configured to calculate the parallax between the corresponding pixels of the two images in the overlap region according to the depth image. When the parallax falls within the preset parallax range, the mapping module 542 discards the pixel points of the second image directly; when the parallax exceeds the preset parallax range, the mapping module 542 maps the pixel points of the second image to the coordinates of the corresponding pixel points of the first image in the target coordinate system. That is, the mapping module 542 calculates the weighted average chrominance value and weighted average luminance value of the corresponding pixel points in the two images, and uses the weighted average chrominance value and the weighted average luminance value as the chrominance value and the luminance value of the corresponding pixel points in the first image in the target coordinate system respectively. Considering the precision required for the stitched image, the preset parallax range is 0 pixel to 1 pixel preferably. After the mapping of the overlap region is completed, the mapping module 542 in this embodiment needs to map the pixels outside the overlap region in the second image to the target coordinate system according to the mapping relation between the pixel in the second image, and the element in the homographic matrix. In this way, the stitched image is complete, and no original data is lost.

By using the image stitching method and apparatus in this embodiment, if the photographing backgrounds of the images are not a single background, the pixels in the images are located at many layers. The method and apparatus in this embodiment may calculate the parallax between the layers precisely by using the depth image, and the pixels of the overlap region can be processed precisely in the process of stitching images to deghost the stitched image. Moreover, this embodiment involves no calibration of the camera, thus simplifying the application of this embodiment.

Because this embodiment is free from calculating numerous intermediate viewpoint images, this embodiment saves the calculation resources in comparison with the method for stitching images based on intermediate viewpoints. In the method for stitching images based on intermediate viewpoints, when one object is watched from two viewpoints, the object is visible from one viewpoint and is not visible from the other viewpoint, and shadows or cavities may occur at the time of generating the intermediate point images. Therefore, the shadow relation needs to be calculated accurately, and the cavities need to be filled. In this embodiment, however, a depth image is used to express 3-dimensional information of the image. Therefore, in the stitched image, the shadow relation is determined according to the depth information directly, and no cavity is generated.

In a practical application of this embodiment, two cameras are used to photograph one object simultaneously, which does not require optical centers of the cameras to coincide. Therefore, this embodiment allows the optical centers of the cameras to be at different points in the photographing process.

Third Embodiment

Figure 7:
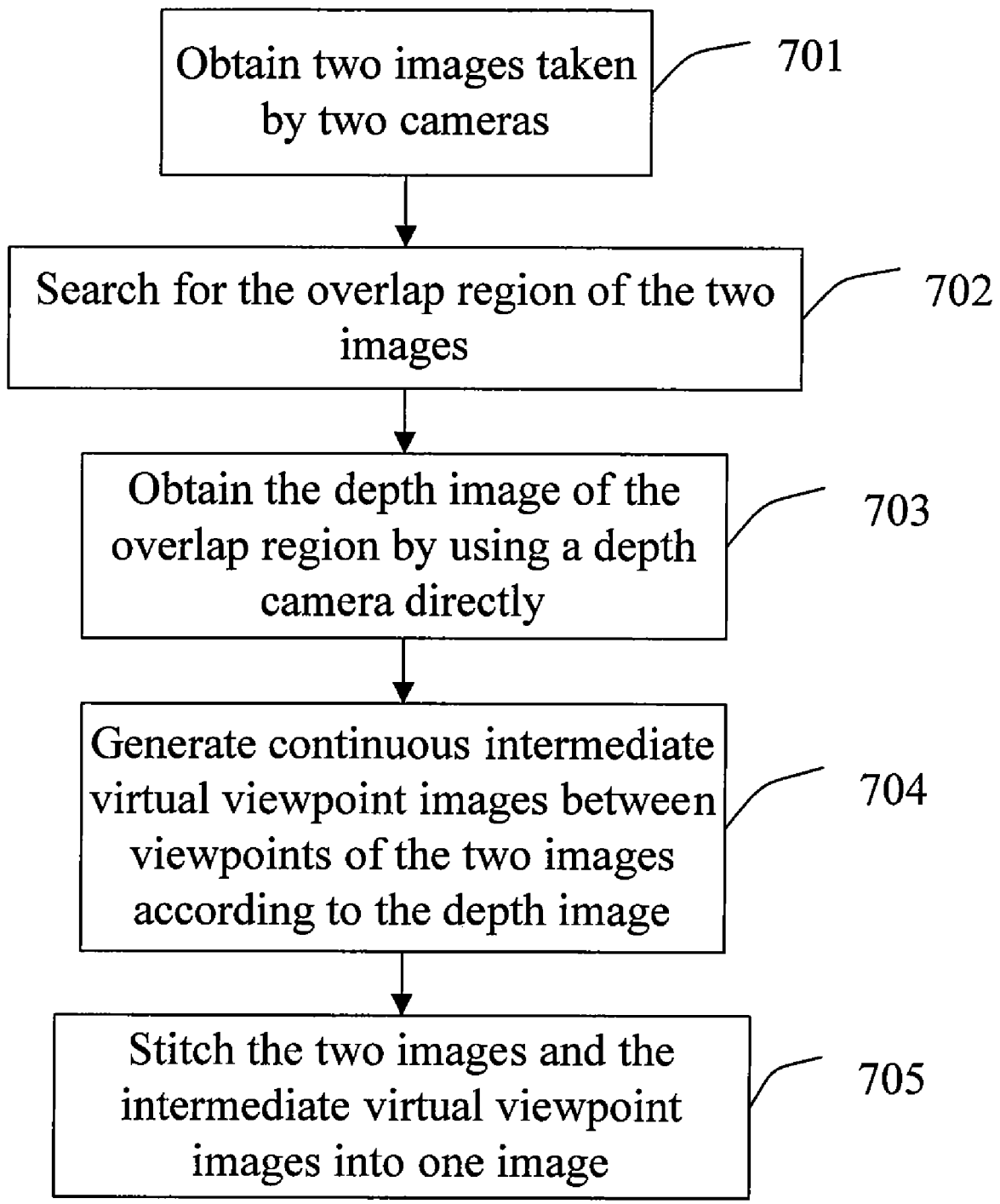
FIG. 7 is a flowchart of an image stitching method in the third embodiment of the present invention.

As shown in FIG. 7, an image stitching method in this embodiment includes the following steps:

701. Use two cameras to photograph objects and obtain two images. An overlap region exists between the objects of the two images.

702. Search for the overlap region of the two images. In practice, the overlap region may be found by using: SIFT feature point detection method, Harris feature point detection method, Susan feature point detection method, 3-dimensional image matching method, or other feature point detection methods. In some cases, the feature points may be selected manually to obtain the overlap region.

703. Use a depth camera to obtain a depth image of the overlap region directly. The depth camera measures the distance from the object to the depth camera directly by physical means, for example, by emitting an electromagnetic wave or an infrared ray to the object. The distance from the object to the depth camera is determined according to the time required for reflecting the electromagnetic wave or infrared ray from the object. That is, in this embodiment, two ordinary cameras mentioned in step 701 need to obtain the images, and the depth camera needs to obtain the depth image.

Described above is an exemplary method for obtaining the depth image of the overlap region. In practice, the method for obtaining the depth image depends on the scene, for example, the depth image is determined by performing the calculation of the parallax between the two images.

704. Generate continuous intermediate virtual viewpoint images between the viewpoints of the two images according to the depth image. Specifically, calculate the parallax between the virtual viewpoint image and the known image by using the following formula:

$$d = A1O1' - A2O2' = f*(CO1 - CO2)/Z = f*B_{p0}/Z.$$

In the formula, d is the parallax between the virtual viewpoint image and the known viewpoint image, f is the focal length of the camera, $B_{p0}$ is the distance between virtual viewpoints, and Z is the depth of the image.

The parallax calculated above and the known image can be used to generate the intermediate virtual viewpoint image by using the following formula:

$$x_p = d \cdot \frac{B_{p0}}{B} + x_0,$$

where: $x_0$ is an X coordinate of the pixel point of the known image, $x_p$ is the corresponding X coordinate of the pixel point of the known image on the intermediate virtual viewpoint image, B is distance between two original photographing points, and $B_{p0}$ is the distance from the intermediate virtual viewpoint to one of the original photographing points.

705. Stitch the two images and the intermediate virtual viewpoint images into one image. Specifically, arrange all images in the order of viewpoints, and then stitch every two images.

Figure 8:
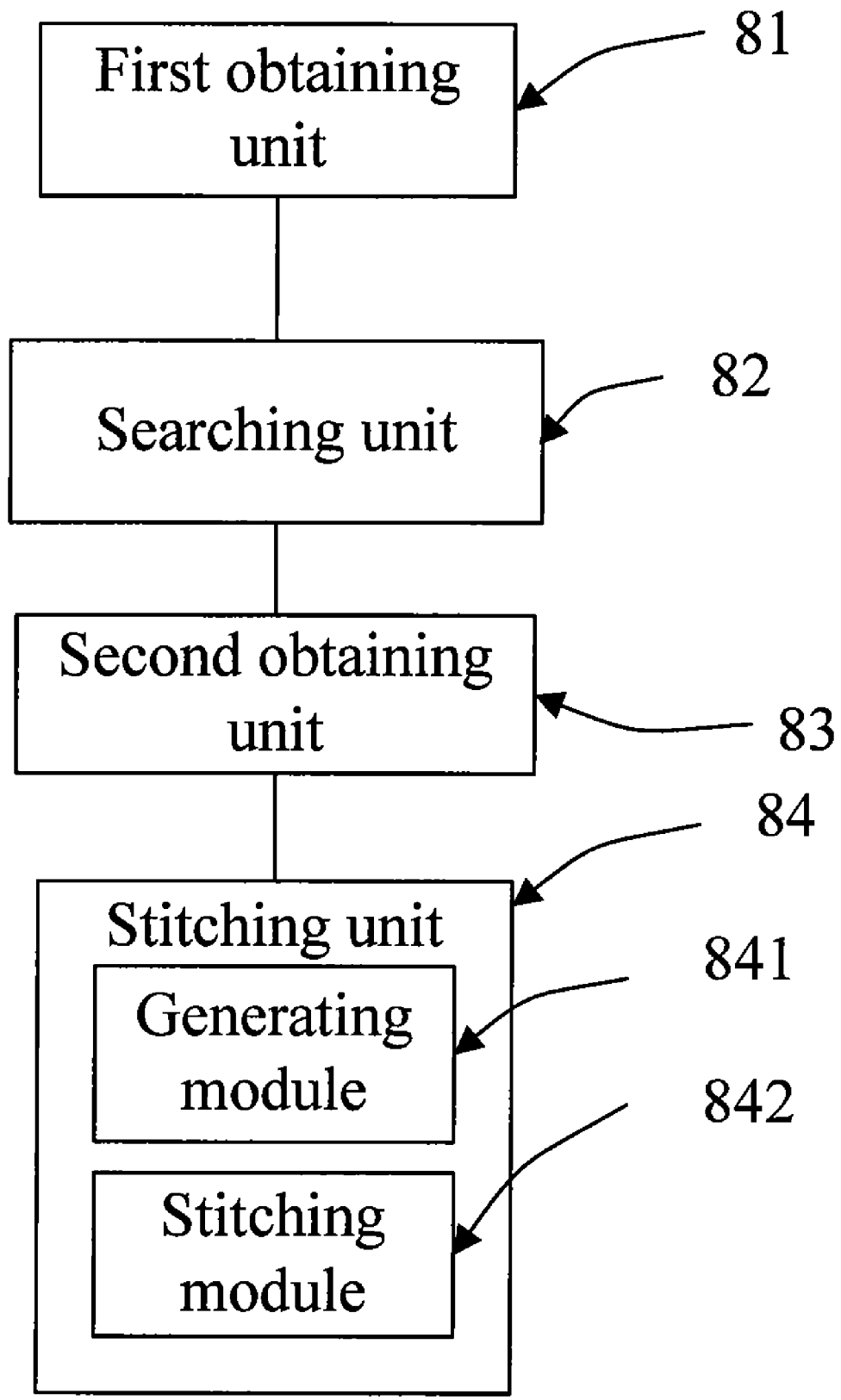
FIG. 8 shows a structure of an image stitching apparatus in the third embodiment of the present invention.

Corresponding to the foregoing image stitching method, an image stitching apparatus is provided in the third embodiment of the present invention. As shown in FIG. 8, the image stitching apparatus includes: a first obtaining unit 81, a searching unit 82, a second obtaining unit 83, and a stitching unit 84.

The first obtaining unit 81 is configured to obtain two images. In this embodiment, the two images are obtained by photographing on cameras in real time. Therefore, the first obtaining unit 81 is a pair of ordinary cameras. The searching unit 82 is configured to search for the overlap region of the two images. The second obtaining unit 83 is a depth camera, and is configured to obtain a depth image of the overlap region.

The stitching unit 84 includes a generating module 841 and a stitching module 842.

The generating module 841 is configured to generate continuous intermediate virtual viewpoint images between viewpoints of the two images according to the depth image, and specifically, calculate the parallax between the intermediate virtual viewpoint image and the known image by using the following formula:

$$d = A1O1' - A2O2' = f*(CO1-CO2)/Z = f*B_{p0}/Z.$$

In the formula, d is the parallax between the virtual viewpoint image and the known viewpoint image, f is the focal length of the camera, $B_{p0}$ is the distance between virtual viewpoints, and Z is the depth of the image.

The parallax calculated above and the known image can be used to generate the intermediate virtual viewpoint image by using the following formula:

$$x_p = d \cdot \frac{B_{p0}}{B} + x_0,$$

where: $x_0$ is an X coordinate of the pixel point of the known image, $x_p$ is the corresponding X coordinate of the pixel point of the known image on the intermediate virtual viewpoint image, B is the distance between two original photographing points, and $B_{p0}$ is the distance from the intermediate virtual viewpoint to one of the original photographing points.

The stitching module 842 is configured to stitch the two images and the intermediate virtual viewpoint images into one image. Specifically, the stitching module 842 arranges all images in the order of viewpoints, and then stitch every two images.

In this embodiment, the stitching method and apparatus use a depth image to calculate the intermediate virtual viewpoint image directly, and then stitch the intermediate virtual viewpoint image and the two original images into one image. Compared with the prior art which uses two images to calculate the intermediate virtual viewpoint image, the method for using a depth image to calculate the intermediate virtual viewpoint image directly in this embodiment can implement faster calculations.

In this embodiment, two images are obtained from different viewpoints, a depth image of the overlap region is calculated, and the two images are stitched according to the depth image. Therefore, the stitching method is applicable to more than the images obtained from the same viewpoint. If two images obtained from the same viewpoint have an overlap region, the stitching method provided in this embodiment is also applicable.

The foregoing embodiments use only two images for description. In practice, in the case of stitching more than two images, two images are stitched into one image first, which is then stitched to a third image in the same way, and so on, to obtain a wide-view image.

The method and apparatus under the present invention are applicable to multi-scene videoconferences and the occasions of making wide-view images or videos.

After reading the foregoing embodiments, those skilled in the art are clearly aware that the embodiments of the present invention may be implemented through hardware only, or preferably, through software in addition to necessary universal hardware. Therefore, the technical solution under the present invention or its novelty over the prior art may be embodied in a software product. The software product is stored in a computer-readable storage medium such as a computer floppy disk, a hard disk and a Compact Disk-Read Only Memory (CD-ROM), and incorporates several instructions for instructing a computer device (for example, a personal computer, a server, or a network device) to execute the method provided in any embodiment of the present invention.

The above descriptions are merely preferred embodiments of the present invention, but not intended to limit the scope of the present invention. Any modifications, variations or replacements that can be easily derived by those skilled in the art should fall within the scope of the present invention. Therefore, the scope of the present invention is subject to the appended claims.

What is claimed is:

1. An image stitching method, comprising:
   obtaining two images between which an overlap region exists;
   searching for the overlap region of the two images;
   obtaining a depth image of the overlap region; and
   stitching the two images into one image according to the depth image, wherein the stitching of the two images into one image according to the depth image comprising:
   calculating a homographic matrix between the two images;
   mapping a first image to a target coordinate system according to a mapping relation between the first image and the homographic matrix;
   calculating an amount of parallax between corresponding pixels of the two images in the overlap region according to the depth image;
   discarding pixel points of a second image if the parallax amount falls within a preset parallax range;
   mapping pixel points of the second image in the overlap region to coordinates of corresponding pixel points of the first image in the target coordinate system if the parallax amount exceeds the preset parallax range; and
   mapping pixels of the second image outside the overlap region to the target coordinate system according to a mapping relation between the second image and the homographic matrix.

2. The image stitching method according to claim 1, wherein obtaining the depth image of the overlap region comprises: obtaining the depth image of the overlap region by using a depth camera directly.

3. The image stitching method according to claim 1, wherein: the target coordinate system is a coordinate system of the first image.

4. The image stitching method according to claim 1, wherein: the mapping of the pixel points of the second image in the overlap region to the coordinates of the corresponding pixel points of the first image in the target coordinate system comprises: calculating a weighted average chrominance value and a weighted average luminance value of the corresponding pixel points in the two images, and using the weighted average chrominance value and the weighted average luminance value as a chrominance value and a luminance value of the corresponding pixel points of the first image in the target coordinate system respectively.

5. An image stitching apparatus, comprising:
  a first obtaining unit configured to obtain two images between which an overlap region exists;
  a searching unit configured to search for the overlap region of the two images;
  a second obtaining unit configured to obtain a depth image of the overlap region; and
  a stitching unit configured to stitch the two images into one image according to the depth image; wherein the stitching unit comprises:
    a first calculating module configured to calculate a homographic matrix between the two images;
    a second calculating module configured to calculate a parallax amount between corresponding pixels of the two images in the overlap region according to the depth image; and
    a mapping module configured to:
      map a first image to a target coordinate system according to a mapping relation between the first image and the homographic matrix;
      map pixel points of a second image in the overlap region to coordinates of corresponding pixel points of the first image in the target coordinate system, if the parallax amount exceeds a preset parallax range; and
      map pixels of the second image outside the overlap region to the target coordinate system according to a mapping relation between the second image and the homographic matrix.

6. The image stitching apparatus according to claim 5, wherein: the second obtaining unit is a depth camera.

7. The image stitching apparatus according to claim 5, wherein the second obtaining unit comprises: a calculating module configured to calculate a parallax amount between corresponding pixels in the overlap region of the two images, and calculate the depth image of the overlap region according to the parallax amount.

8. The image stitching apparatus according to claim 5, wherein the second obtaining unit comprises: an obtaining module configured to obtain two new images in the overlap region at two viewpoints; and a calculating module configured to calculate a parallax amount between corresponding pixels in the two new images, and calculate the depth image in the overlap region according to the parallax amount.

9. The image stitching apparatus according to claim 5, wherein:
  the mapping module is configured to:
    calculate a weighted average chrominance value and a weighted average luminance value of the corresponding pixel points in the two images, if the parallax amount exceeds the preset parallax range; and
    use the weighted average chrominance value and the weighted average luminance value as a chrominance value and a luminance value of the corresponding pixel points of the first image in the target coordinate system, respectively.

10. The image stitching method according to claim 1, wherein obtaining the depth image of the overlap region comprises:
  calculating a parallax amount between corresponding pixels in the overlap region of the two images; and
  calculating the depth image of the overlap region according to the parallax amount.

11. The image stitching method according to claim 1, wherein obtaining the depth image of the overlap region comprises: obtaining two new images in the overlap region at two viewpoints; calculating a parallax amount between corresponding pixels in the two new images; and calculating the depth image in the overlap region according to the parallax amount.

* * * * *